United States Patent [19]

Tanaka et al.

[11] Patent Number: 5,665,836
[45] Date of Patent: Sep. 9, 1997

[54] METHOD OF PREPARING VINYL CHLORIDE POLYMERS AND COPOLYMERS OF IMPROVED ANTISTATIC PERFORMANCE

[75] Inventors: Toshihiko Tanaka; Hiroshi Minamide, both of Yokkaichi, Japan

[73] Assignee: Tosoh Corporation, Shinnanyo, Japan

[21] Appl. No.: 510,938

[22] Filed: Aug. 3, 1995

Related U.S. Application Data

[63] Continuation of Ser. No. 155,770, Nov. 23, 1993, abandoned.

[30] Foreign Application Priority Data

Dec. 10, 1992 [JP] Japan ................................. 4-330442
Dec. 10, 1992 [JP] Japan ................................. 4-330443

[51] Int. Cl.$^6$ .................................................. C08F 2/00
[52] U.S. Cl. .......................... 526/210; 523/334; 524/386; 524/387; 526/209; 528/495; 528/496
[58] Field of Search ........................ 524/386, 387; 526/209, 210; 528/495, 496; 523/334

[56] References Cited

U.S. PATENT DOCUMENTS

| | | |
|---|---|---|
| 4,015,064 | 3/1977 | Feldman et al. .................. 528/491 |
| 4,246,168 | 1/1981 | Sorenson ...................... 260/45.75 J |
| 4,604,419 | 8/1986 | Smallwood ....................... 524/318 |
| 4,885,333 | 12/1989 | Amano et al. .................... 524/762 |

FOREIGN PATENT DOCUMENTS

| | | |
|---|---|---|
| 26 25 167 | 12/1977 | Germany . |
| 2000 25 | 3/1983 | Germany . |
| 31 35 198 | 3/1983 | Germany . |

*Primary Examiner*—Paul R. Michl
*Assistant Examiner*—U. K. Rajguru
*Attorney, Agent, or Firm*—Oblon, Spivak, McClelland, Maier & Neustadt, P.C.

[57] ABSTRACT

A method of producing suspension polymerized vinyl chloride polymers or copolymers of improved flowability by polymerizing vinyl chloride monomers alone, or in a mixture with other monomers, in an aqueous medium, to form a slurry of polymer suspended in said aqueous medium. After removing unreacted monomers, a polyhydric alcohol is added to the slurry containing the suspension polymerized polymer or to a product obtained after the dewatering of the slurry, in an amount of 0.001 to 0.5 parts by weight based on 100 parts by weight of the vinyl chloride polymer or copolymer suspended in the slurry.

3 Claims, No Drawings

METHOD OF PREPARING VINYL CHLORIDE POLYMERS AND COPOLYMERS OF IMPROVED ANTISTATIC PERFORMANCE

This application is a file wrapper continuation of Ser. No. 08/155770 filed Nov. 23, 1993, now abandoned.

BACKGROUND OF THE INVENTION

The present invention relates to a method of producing vinyl chloride polymer or copolymer through the suspension polymerization process. In particular, it relates to a production method of vinyl chloride polymer or copolymer having excellent fluidity.

The vinyl chloride polymer or copolymer is usually produced through the suspension polymerization process and, after the refinements such as separation from slurry and drying, it is conveyed by the pneumatic transportation for storage or bag-filling.

However, the vinyl chloride polymer or copolymer thus obtained carries the static electricity through the frictions by itself and with other materials in the processes of conveyance and bag-filling to reduce the fluidity and to decrease the bulk density over the vinyl chloride polymer or copolymer just after the production. Hence, it becomes remarkably difficult in handling, posing a problem of serious obstacles in operation. As the methods of alleviating the adverse effect due to such electrification of polymer, a method to add a nonionic surfactant, cationic surfactant or the like being an antistatic agent to vinyl chloride polymer or copolymer and a method to adjust the humidity by blowing the steam into vinyl chloride polymer or copolymer have been employed so far.

Said method to add the surfactant, however, has such drawbacks that it cannot enough prevent the decrease in bulk specific gravity of polymer and, in addition, it adversely affects the thermal stability and the initial coloring property of product. Moreover, the method to blow the steam has drawbacks of increased labor requirement, complicated equipment and the like.

SUMMARY OF THE INVENTION

This invention has as its objective the production of vinyl chloride polymers or copolymers of improved flowability and antistatic performance when dry. The polymers or copolymers are produced via a suspension polymerization process. The process includes polymerizing, in an aqueous medium, a vinyl chloride monomer or a mixture of vinyl chloride monomer and other monomers polymerizable therewith wherein vinyl chloride is a major component of the mixture. The polymerization is conducted to completion using a suspension polymerization process, thereby forming an aqueous slurry containing the vinyl chloride polymer or copolymer. A polyhydric alcohol is added to the aqueous slurry, or to a product formed after dewatering of the slurry. The polyhydric alcohol is added as an aqueous solution having a concentration of 5 to 90 percent, the amount of polyhydric alcohol added being from 0.001 to 0.5 parts by weight based on 100 parts by weight of the vinyl chloride polymer or copolymer. The dewatered slurry containing the polymer treated with polyol may be dried using a fluidized drying technique.

DETAILED DESCRIPTION OF THE INVENTION

In the method of the invention, the vinyl chloride polymer or copolymer is first synthesized through the suspension polymerization process. As the vinyl chloride polymers, homopolymer of vinyl chloride and copolymers of vinyl chloride with other copolymerizable vinyl monomers can be mentioned. As the vinyl type monomers copolymerizable with vinyl chloride, for example, alkyl vinyl esters such as vinyl acetate, alkyl vinyl ethers such as cetyl vinyl ether, α-monoolefinic monomers such as ethylene and propylene, acrylic alkyl esters such as methyl acrylate and methacrylic alkyl esters such as methyl methacrylate are mentioned.

The suspension polymerization of vinyl chloride polymer or copolymer is well known and vinyl chloride monomer or vinyl chloride monomer and other polymerizable vinyl monomers are polymerized in an aqueous medium in the presence of suspending agent and polymerization initiator. In this way, a slurry containing vinyl chloride polymer or copolymer can be obtained through the suspension polymerization process.

Next, according to the inventive method, a polyhydric alcohol is added to the slurry containing vinyl chloride polymer, polymer or copolymer cake obtainable after the dewatering of said slurry or powder of vinyl chloride polymer or copolymer after the drying of said polymer cake as an aqueous solution of concentration of 5 to 90%. Such polyhydric alcohols include ethylene glycol, propylene glycol, glycerine, pentaerythritol and their polycondensates and water-soluble polyhydric alcohols having these as major components. The addition level of said polyhydric alcohol is preferable to be 0.001 to 0.5 parts by weight to 100 parts by weight of vinyl chloride polymer or copolymer. If the addition level is under 0.001 parts by weight, the extreme decrease in bulk density due to electrification cannot be prevented. Even if the addition level may exceed 0.5 parts by weight, the effect of addition is not enhanced beyond, which is uneconomical.

In following, the invention will be illustrated concretely based on the examples, but the invention is not confined thereto.

EXAMPLE 1

Into a stainless steel polymerization reactor were charged 100 parts by weight of vinyl chloride monomer, 150 parts by weight of deionized water, 0.1 part by weight of partially saponified poly(vinyl alcohol) and 0.04 parts by weight of 2-ethylhexyl peroxydicarbonate, and the polymerization was conducted at a temperature of 57° C. When the pressure inside the polymerization reactor reached kg/cm$^2$ (gauge), the unreacted vinyl chloride monomer was recovered to obtain a slurry of vinyl chloride polymer. Tetraglycerine a tetramer of glycerine having the structural formula HO CH$_2$ CH(OH)CH$_2$O(CH$_2$CH(OH)CH$_2$O)$_2$ CH$_2$ CH(OH) CH$_2$OH was added to the polymer slurry thus obtained as 30% aqueous solution in an amount of 0.1 part by weight based on polymer. Thereafter, the polymer was separated from said slurry and submitted to fluidized drying for 2 hours at 70° C. to obtain vinyl chloride polymer.

EXAMPLES 2 THROUGH 4

Similarly to Example 1, vinyl chloride polymers were obtained, except that the type of polyhydric alcohol, addition level and concentration of aqueous solution in Example 1 were varied as the conditions shown in table 1.

EXAMPLE 5

Into a stainless steel polymerization reactor were charged 100 parts by weight of vinyl chloride monomer, 150 parts by weight of deionized water, 0.1 part by weight of partially saponified poly(vinyl alcohol) and 0.04 parts by weight Of 2-ethylhexyl peroxydicarbonate, and the polymerization was conducted at a temperature of 57° C. When the pressure inside the polymerization reactor reached 6.0 kg/cm² (gauge), the unreacted vinyl chloride monomer was recovered and the slurry was dewatered to obtain a cake of vinyl chloride polymer containing 20% by weight of water. Ethylene glycol was added to the polymer cake thus obtained, as 30% aqueous solution in an amount of 0.1 part by weight based on polymer, which was then submitted to fluidized drying for 2 hours at 70° C. to obtain vinyl chloride polymer.

EXAMPLE 6

Into a stainless steel polymerization reactor were charged 100 parts by weight of vinyl chloride monomer, 150 parts by weight of deionized water, 0.1 part by weight of partially saponified poly(vinyl alcohol) and 0.04 parts by weight of 2-ethylhexyl peroxydicarbonate, and the polymerization was conducted at a temperature of 57° C. When the pressure inside the polymerization reactor reached 6.0 kg/cm² (gauge), the unreacted vinyl chloride monomer was recovered and the slurry was dewatered and then submitted to fluidized drying for 2 hours at 70° C. to obtain vinyl chloride polymer. Ethylene glycol was added to the vinyl chloride polymer obtained as 50% aqueous solution in amounts of 0.05 parts by weight based on polymer under fluidized state.

EXAMPLES 7 THROUGH 9

Similarly to Example 6, vinyl chloride polymers were obtained, except that the type of polyhydric alcohol, addition level and concentration of aqueous solution in Example 6 were varied as the conditions shown in Table 2.

COMPARATIVE EXAMPLE 1

Similarly to Example 1, vinyl chloride polymer was obtained, except that tetraglycerine in Example was not added.

COMPARATIVE EXAMPLE 2

Similarly to Example 1, vinyl chloride polymer was obtained, except that 50% aqueous solution of polyoxyethylene sorbitan monolaurate were used in place of tetraglycerine in Example 1.

With the vinyl chloride polymers obtained in Examples 1 through 9 and Comparative examples 1 and 2 aforementioned, measurement test of bulk density and test of thermal stability were performed. The results are shown in Tables 1 and 2.

1. Measurement Test of Bulk Density

After the vinyl chloride polymer was allowed to stand for 48 hours in a thermohygrostatic room of temperature of 23° C. and relative humidity of 50%, the bulk density was measured according to the method of JIS K-6721.

Moreover, after the vinyl chloride polymer allowed to stand for 48 hours under the same conditions as above was stirred for 2 minutes at 60 rpm with Brabender planetary mixer, the bulk density was compared by the same method as above.

2. Thermal Stability

To 100 parts by weight of vinyl chloride polymer,
tribasic lead sulfate 1.0 part by weight
lead stearate 1.5 part by weight
calcium stearate 0.5 part by weight
were formulated and, after kneading for 5 minutes on rolls of 190° C., 1 mm thick sheet was fabricated. This sheet was placed in an oven of 190° C. and the time required for blackening was measured.

TABLE 1

| | | Example 1 | Example 2 | Example 3 | Example 4 |
|---|---|---|---|---|---|
| Additive | Type | Tetraglycerine | Hexaglycerine | Tetraethylene glycol | Ethylene glycol |
| | Concentration of aqueous solution (%) | 30 | 30 | 30 | 30 |
| | Addition level (part by weight) | 0.1 | 0.1 | 0.1 | 0.1 |
| | Adding condition | Addition to polymer slurry | Addition to polymer slurry | Addition to polymer slurry | Addition to polymer slurry |
| Bulk Density (g/cc) | No mixing | 0.552 | 0.551 | 0.551 | 0.555 |
| | Mixing | 0.549 | 0.550 | 0.551 | 0.553 |
| Thermal stability (min) | | 60 | 60 | 60 | 60 |

TABLE 2

| | | Example 5 | Example 6 | Example 7 | Example 8 | Example 9 | Comparative example 1 | Comparative example 2 |
|---|---|---|---|---|---|---|---|---|
| Additive | Type | Ethylene glycol | Ethylene glycol | Glycerine | Propylene glycol | Tetraglycerine | — | Polyoxyethylen sorbitan monolaurate |
| | Concentration of aqueous solution (%) | 30 | 50 | 50 | 50 | 50 | — | 50 |
| | Addition level (part by weight) | 0.1 | 0.05 | 0.05 | 0.05 | 0.05 | — | 0.1 |
| | Adding condition | Addition to | Addition to | Addition to | Addition to | Addition to | — | Addition to |

TABLE 2-continued

|  |  | Example 5 | Example 6 | Example 7 | Example 8 | Example 9 | Comparative example 1 | Comparative example 2 |
|---|---|---|---|---|---|---|---|---|
|  |  | polymer cake | dried powder of polymer | dried powder of polymer | dried powder of polymer | dried powder of polymer |  | polymer slurry |
| Bulk Density (g/cc) | No mixing | 0.556 | 0.554 | 0.554 | 0.555 | 0.553 | 0.555 | 0.553 |
|  | Mixing | 0.553 | 0.552 | 0.554 | 0.552 | 0.552 | 0.510 | 0.540 |
| Thermal stability (min) |  | 60 | 60 | 60 | 60 | 60 | 60 | 50 |

What is claimed is:

1. A method of producing suspension polymerized vinyl chloride polymer or copolymer of improved flowability and anti-static performance when dried and in powder form, comprising the steps of:

(a) suspension polymerizing in an aqueous medium and in the presence of a suspending agent, a vinyl chloride monomer, or a mixture of monomers containing vinyl chloride as a major component, to form a slurry of polymer or copolymer suspended in said aqueous medium, (b) recovering unreacted vinyl chloride monomer from said slurry, (c) adding an aqueous solution of polyhydric alcohol having a concentration of 5 to 90% to said slurry, wherein said polyhydric alcohol is ethylene glycol, a polycondensate of ethylene glycol, propylene glycol, a polycondensate of propylene glycol, or pentaerythritol, and wherein said polyhydric alcohol is added to said slurry in an amount of 0.001 to 0.5 parts by weight based on 100 parts by weight of vinyl chloride polymer or copolymer, separating the polymer or copolymer from said slurry and recovering said polymer or copolymer in powder form.

2. The method of claim 1, wherein said separated polymer is submitted to fluidized drying.

3. A method of producing suspension polymerized vinyl chloride polymer or copolymer of improved flowability and excellent anti-static performance when dried and in powder form, comprising the steps of:

(a) suspension polymerizing in an aqueous medium and in the presence of a suspending agent, a vinyl chloride monomer, or a mixture of monomers containing vinyl chloride as a major component, to form a slurry of polymer or copolymer suspended in said aqueous medium, (b) recovering unreacted vinyl chloride monomer from said slurry, (c) dewatering said slurry to form a polymer cake, and (d) adding to said polymer cake a 5 to 90% aqueous solution of polyhydric alcohol, the amount of said polyhydric alcohol added to said polymer cake being from 0.001 to 0.5 parts by weight based on the vinyl chloride polymer or copolymer wherein said polyhydric alcohol is ethylene glycol, a polycondensate of ethylene glycol, propylene glycol, a polycondensate of propylene glycol, or pentaerythritol, and wherein said polyhydric alcohol is added in an amount of 0.001 to 0.5 parts by weight based on 100 parts by weight of vinyl chloride polymer, and recovering said polymer or copolymer in powder form.

* * * * *